(12) United States Patent
Asakura et al.

(10) Patent No.: US 8,218,241 B2
(45) Date of Patent: Jul. 10, 2012

(54) VIEWING OPTICAL SYSTEM AND IMAGING APPARATUS USING THE SAME

(75) Inventors: Ayako Asakura, Hino (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 451 days.

(21) Appl. No.: 12/454,684

(22) Filed: May 20, 2009

(65) Prior Publication Data
US 2009/0290224 A1 Nov. 26, 2009

(30) Foreign Application Priority Data
May 21, 2008 (JP) ................................. 2008-132722

(51) Int. Cl.
*G02B 25/00* (2006.01)
(52) U.S. Cl. ....................................... 359/645; 359/642
(58) Field of Classification Search .................. 359/645, 359/642, 643
See application file for complete search history.

(56) References Cited

U.S. PATENT DOCUMENTS
5,568,319 A * 10/1996 Kaneko et al. ................ 359/643

FOREIGN PATENT DOCUMENTS
JP 05-215974 8/1993
JP 2006-106491 4/2006
* cited by examiner

*Primary Examiner* — James Greece
(74) *Attorney, Agent, or Firm* — Kenyon & Kenyon LLP

(57) ABSTRACT

The invention provides a viewing optical system positioned between a viewing plane as a virtual plane and an eye point. The viewing optical system comprises, in order from the viewing plane side, a first lens group including a positive lens or a negative lens, a second lens group including a cemented lens in which at least one negative lens and at least one positive lens are cemented together, and a third lens group including a positive lens. Of lenses forming the first, second, and third lens groups, at least one lens surface is an aspheric surface.

19 Claims, 10 Drawing Sheets

Example 1

Example 1

Example 2

Example 3

Example 1

Example 2

Example 3

(a)

(b)

VIEWING OPTICAL SYSTEM AND IMAGING APPARATUS USING THE SAME

This application claims benefit of Japanese Application No. 2008-132722 filed in Japan on May 21, 2008, the contents of which are incorporated by this reference.

BACKGROUND OF THE INVENTION

The invention relates to a viewing optical system, and an imaging apparatus using the same.

Patent Publication 1 shows a viewfinder that uses an aspheric surface to correct it for distortion with fewer lenses.
Patent Publication 1: JP(A) 5-215974

SUMMARY OF THE INVENTION

The present invention provides a viewing optical system positioned between a viewing plane as a virtual surface and an eye point, characterized by comprising, in order from said viewing plane side, a first lens group including a positive lens or a negative lens, a second lens group including a cemented lens in which at least one negative lens and at least one positive lens are cemented together, and a third lens group including a positive lens, wherein of lenses forming the first, second and third lens groups, at least one lens surface is composed of an aspheric surface.

The present invention also provides an imaging apparatus characterized by comprising an imaging device, an image display device adapted to display an image, a controller adapted to convert image information obtained from said imaging device into signals displayable on said image display device, and a viewfinder adapted to guide an image displayed on said image display device to a viewer's eye, wherein the above viewing optical system is used for said viewfinder.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Some embodiments of the inventive optical system are now explained. In what follows, it should be noted that an eye point E refers to a position (the position of a virtual stop S) where the farthest off-axis light beam leaving a viewing plane D passes full through the virtual stop S of ϕ4. At this position, the diameter of the farthest off-axis light beam is substantially in coincidence with the diameter (ϕ4) of an aperture in the virtual stop S. It should also be noted that an eye point distance EP refers to a distance from the lens surface located in the viewing optical system (eyepiece lens) and nearest to an eye point side to the eye point (see FIG. 12($a$)).

Figure 12A:
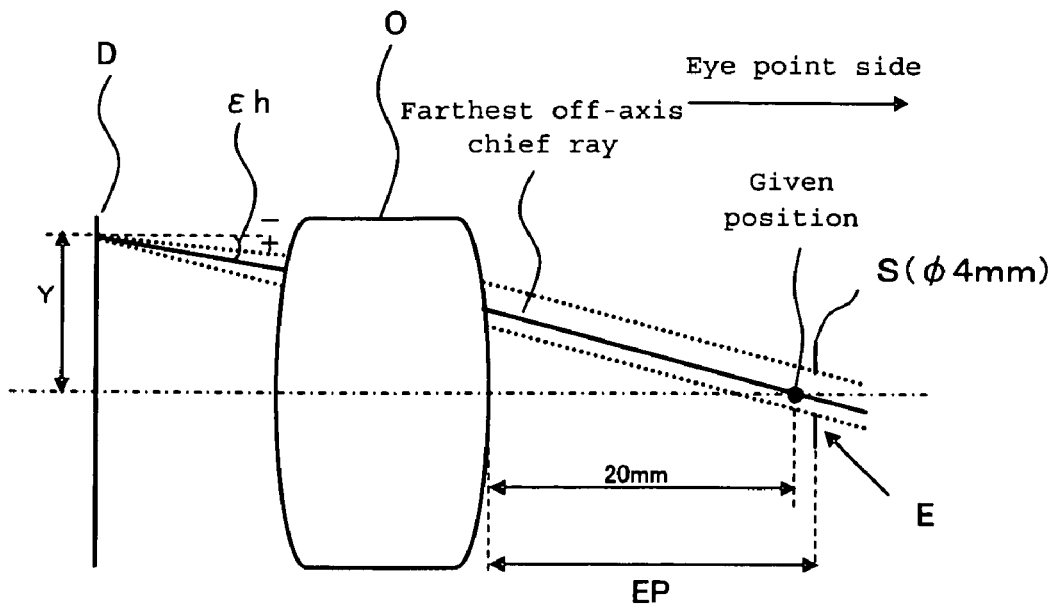
FIG. 12($a$) is illustrative of Condition (5), and FIG. 12($b$) is illustrative of Condition (6).
Figure 12B:
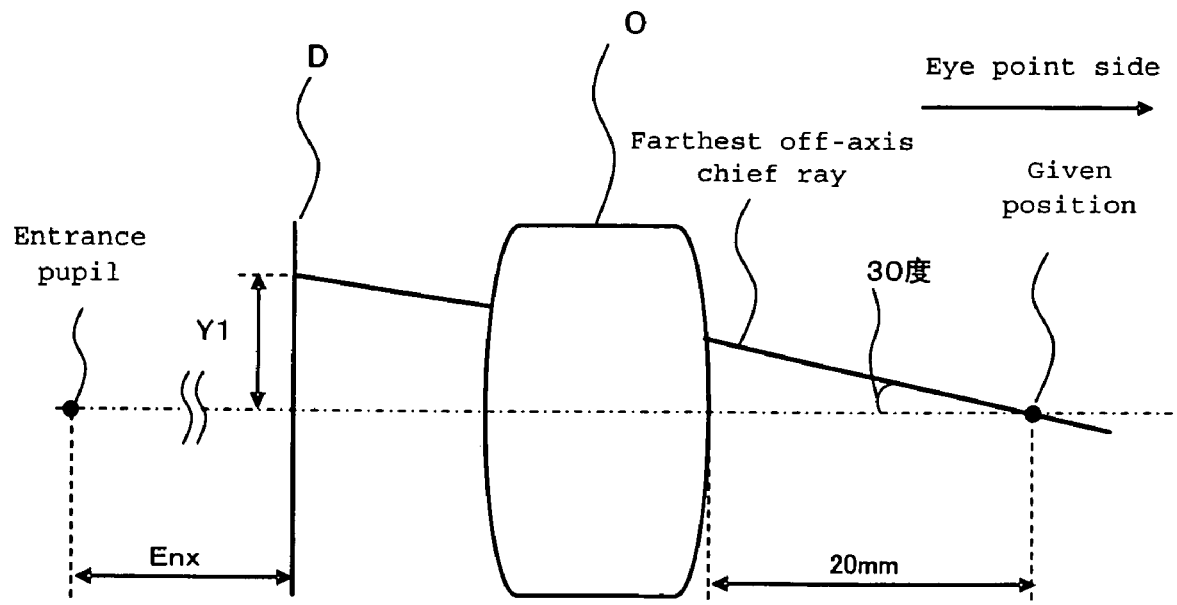

It should be noted that in FIG. 12($a$), the given position is off the position of the eye point (virtual stop): the eye point distance is 20 mm longer. However, the given position may be in coincidence with the position of the eye point (virtual stop). When the given position is different from the eye point position, there is a difference in width between the upper and lower light beams at that eye point. When the given position is identical with the eye point position, the widths of the upper and lower light beams are going to be equal at the eye point position.

The viewing optical system here is suitable for use on a viewfinder. In the viewfinder, specific objects such as a field stop, ground glass or an image display device are located on a position of the viewing plane D. However, the viewing optical system itself has none of the specific objects at the position of the viewing plane D. In the viewing optical system, therefore, the viewing plane D becomes a virtual surface.

The viewing optical system here is interposed between the viewing plane as a virtual surface and the eye point. This viewing optical system comprises, in order from the viewing plane side, a first lens group including a positive lens or a negative lens, a second lens group including a cemented lens in which at least one negative lens and at least one positive lens are cemented together, and a third lens group including a positive lens. With such arrangement, the viewing optical system here enables chromatic aberrations to be well corrected at the negative and positive lenses in the cemented lens. The viewing optical system here includes one positive lens in addition to the cemented lens. With one such positive lens, therefore, it is possible to gain an adequate eye point distance and a wide angle of field.

In the above arrangement, at least one lens surface of the lenses constituting the first, second, and third lens groups comprises an aspheric surface. By use of the aspheric surface, monochromatic aberration can be corrected. This is also preferable for correction of aberrations, because the performances of off-axis light beams and axial light beams can separately be corrected.

Figure 9:
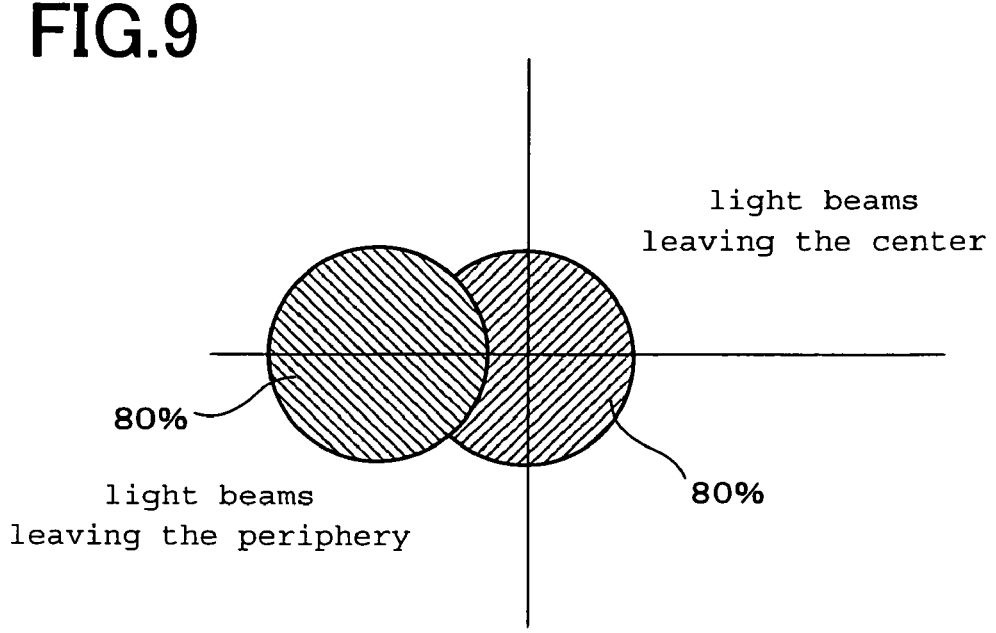
FIG. 9 is illustrative of a light beam from the center and a light beam from the periphery.

It is preferable that on the viewing side surface in the first lens group in the viewing optical system here, 80% of light beams leaving the center of the viewing plane and 80% of light beams leaving the periphery of the viewing plane do not overlap (see FIG. 9). To put it another way, an area wherein the light beams leaving the center and the light beams leaving the periphery overlap should account for at most 20% of the whole (the whole of light beams leaving the center or the whole of light beams leaving the periphery).

Thus, as axial light beams are separate from off-axis light beams, influences on one are held back while aberration correction of another can easily be implemented. This is preferable because the imaging capabilities of the off-axis and axial light beams can be considered separately.

In the viewing optical system here, the lens located in the third lens group and nearest to the eye point side preferably comprises one positive lens.

As the positive lens is located nearest to the eye point side, it allows an adequate eye point distance and a wide angle of field to be obtained.

Preferably for the viewing optical system here, the above aspheric surface is of such a shape that the first normal to the first point on it intersects the second normal to the second point on it, and satisfies the following condition (1).

$$0 < ax/Ra < 1 \quad (1)$$

Figure 10:
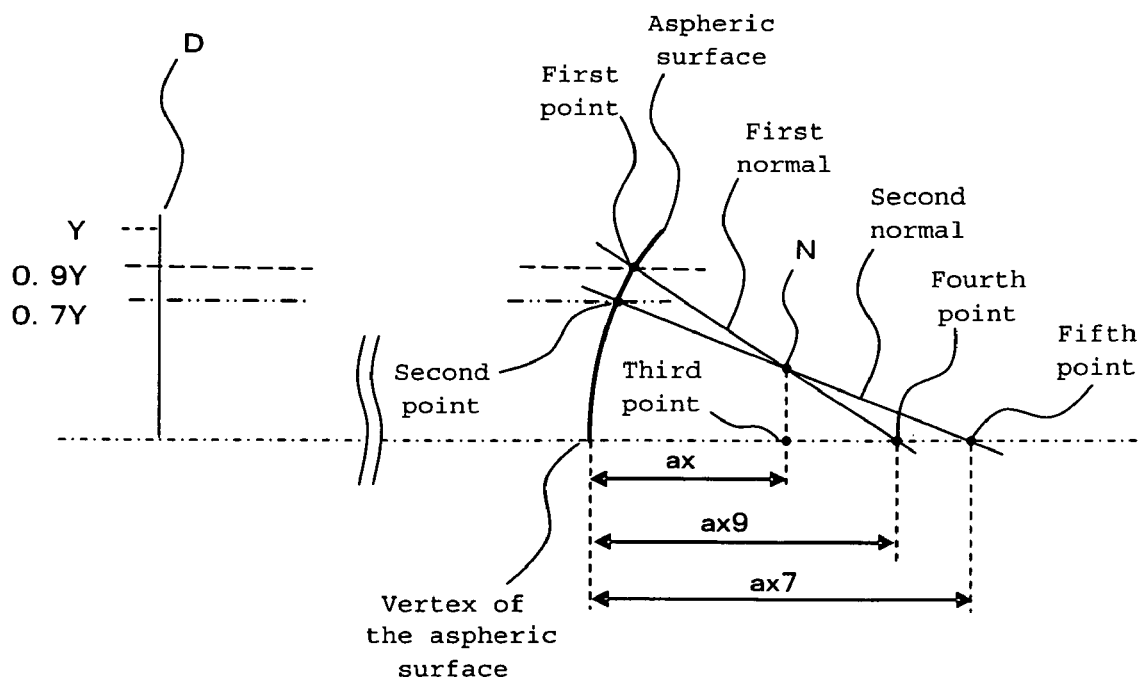
FIG. 10 is illustrative of Conditions (1) and (3).

Here ax is an axial distance (calculated on an air basis) from the vertex of the aspheric surface to the third point, wherein the third point is defined by a point where a straight line passing through a point of intersection N and vertical to the optical axis intersects the optical axis, Y is a position of said viewing plane where the farthest off-axis ray passes, the first point is defined by a point where an off-axis chief ray at a position nine-tenth (0.9Y) of the position Y intersects the aspheric surface, the second point is defined by a point where an off-axis chief ray at a position seven-tenth (0.7Y) of the position Y intersects the aspheric surface, and N is the point of intersection of the first normal and the second normal, and Ra is the radius of curvature of the vertex of the aspheric surface (see FIG. 10).

By the satisfaction of Condition (1), it is possible to make satisfactory correction of astigmatism, coma and distortion. Exceeding the upper limit of 1 to Condition (1) is not preferable because it is less effective on correction of astigmatism, coma and distortion. Being short of the lower limit of 0 to Condition (1) is again not preferable because there is no balance kept between astigmatism, coma and distortion.

For the viewing optical system here, it is preferable to satisfy the following condition (2).

$$-8 < r3/f < -0.2 \quad (2)$$

Here r3 is the radius of curvature of the lens surface positioned in the cemented lens and nearest to the viewing plane side, and f is the focal length of the whole viewing optical system.

By the satisfaction of Condition (2), it is possible to make satisfactory correction of aberrations while the optical system is kept compact.

As the lower limit of −8 to Condition (2) is not reached, there is an increasing load of the positive lens positioned nearest to the eye point side on correction of aberrations. This is not preferable, because field curvature in particular or the like goes worse. The positive lens positioned nearest to the eye point side, for instance, corresponds to the positive lens in the third lens group.

As the upper limit of −0.2 to Condition (2) is exceeded, the radius of curvature of the viewing plane side of the cemented lens grows tight or becomes small. This is not preferable, because spherical aberrations and coma go worse.

More preferably for correction of aberrations, the lower limit of Condition (2) should be set at −6, and especially at −4.

Preferably in the viewing optical system here, the first lens group has an aspheric surface.

If the aspheric surface is applied to the first lens group, it is then possible to make the degree of separation of light beams high and the whole system small.

Preferably in the viewing optical system here, the eye point side surface in the first lens group should be aspheric.

If the aspheric surface is applied to the eye point side surface in the first lens group, it is then possible to make sure the degree of separation of light beams, and the spreading of light beams as well. It is thus possible to increase the ability of the optical system to correct coma, etc.

Preferably in the viewing optical system, the aspheric surface should have two or more points of inflection where curvature changes direction.

If the aspheric surface has two or more points of inflection where curvature changes direction, it is then possible to make satisfactory correction of light beams passing between the center and the periphery for aberrations, resulting in improvements in the performance of the optical system in a mid-angle-of-field area.

For the viewing optical system here, it is preferable to satisfy the following conditions (3) and (3)'.

$$0 < Ra/ax9 < 5 \quad (3)$$

$$0 < Ra/ax7 < 5 \quad (3)'$$

Here ax9 is an axial distance (calculated on an air basis) from the vertex of the aspheric surface to the fourth point, and ax7 is an axial distance (calculated on an air basis) from the vertex of the aspheric surface to the fifth point, wherein Y is a position of the farthest off-axis chief ray on the viewing plane, the fourth point is defined by a position at which the first normal at the first point intersects the optical axis, the first point is defined by a point where the farthest off-axis chief ray at a position nine-tenth (0.9Y) of the position Y intersects the aspheric surface, the fifth point is defined by a point where the second normal at the second point intersects the optical axis, the second point is defined by a point where the farthest off-axis chief ray at a position seven-tenth (0.7Y) of the position Y intersects the aspheric surface, and Ra is the radius of curvature of the vertex of the aspheric surface (see FIG. 10).

By the satisfaction of Conditions (3) and (3)', astigmatism, coma and distortion can satisfactorily be corrected. Exceeding the upper limit of 5 to Conditions (3) and (3)' is not preferable because the effect on correction of astigmatism, coma and distortion becomes tenuous, and being short of the lower limit of 0 to Conditions (3) and (3)' is again not preferable because there is no balance kept between astigmatism, coma and distortion.

For the viewing optical system here, it is preferable to satisfy the following condition (4).

$$-0.5 < \Delta x/h < -0.035 \quad (4)$$

Figure 11:
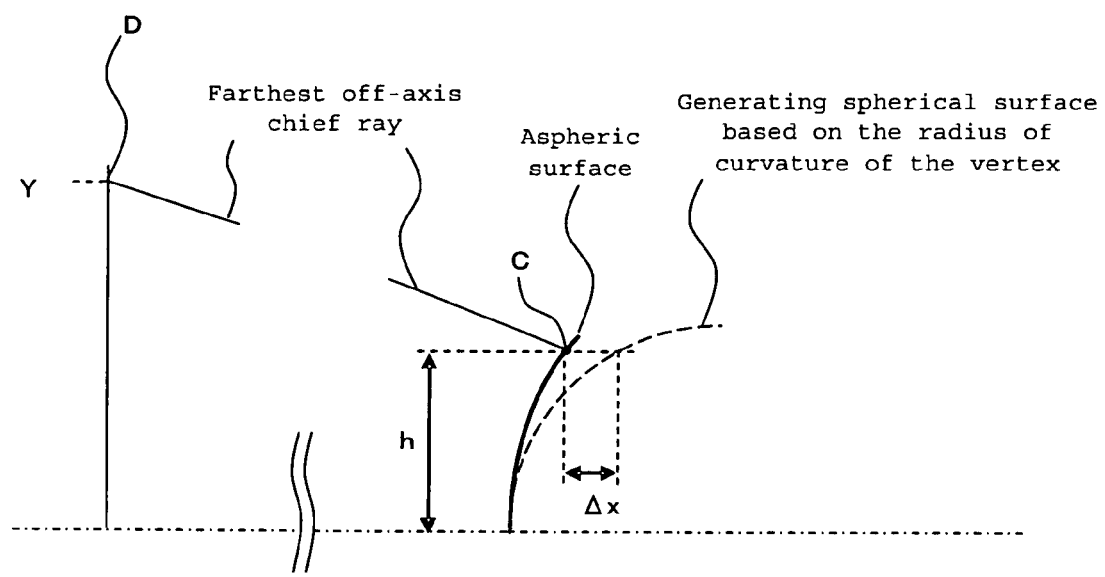
FIG. 11 is illustrative of Condition (4).

Here h is a distance from the optical axis of a position C where the farthest off-axis chief ray intersects the aspheric surface, and ΔX is an axial direction distance between the aspheric surface at the point C and a generating spherical surface based on the radius of curvature of the axial vertex of the aspheric surface (see FIG. 11).

Being short of the lower limit of −0.5 to Condition (4) is not preferable, because distortion makes too large a tilt toward the − side and a meridional surface makes too large a tilt toward the + side. Exceeding the upper limit of −0.035 to Condition (4) is again not preferable because distortion makes too large a tilt toward the + side and the meridional surface makes too large a tilt toward the − side.

For the viewing optical system here, it is preferable to satisfy the following condition (5).

$$0° < \epsilon h < 20° \quad (5)$$

Here eh is an exit angle (°) of the farthest off-axis chief ray on the viewing plane provided that the farthest off-axis chief ray is the outermost of off-axis chief rays that intersect the optical axis of the viewing optical system at the given position, and the given position is 20 mm spaced away from the lens surface located in the viewing optical system and nearest to the eye point side toward the eye point side (see FIG. 12). Note here that the clockwise direction from a reference position is plus, and the counterclockwise direction is minus.

By the satisfaction of Condition (5), it is possible to keep the optimum eye point distance so that the size of the optical system can be reduced.

As the lower limit of 0° to Condition (5) is not reached, it causes the range of light rays from the viewing plane to grow wide. This is not preferable because the outer diameter of the optical system grows large.

As the upper limit of 20° to Condition (5) is exceeded, it causes the range of light rays from the viewing plane to turn too inward. This is not preferable because to make sure the eye point distance, the optical system must have a longer total length.

For the viewing optical system here, it is preferable to satisfy the following condition (6).

$$0 < Enx/Y1 < 40 \quad (6)$$

Here Enx is a distance from the viewing plane to an entrance pupil, and

Y1 is the height of a given off-axis chief ray on the viewing plane, provided that the given off-axis chief ray is defined by a chief ray corresponding to an angle of field of 30° of off-axis chief rays that intersect the optical axis of the viewing optical system at a given position, and the given position is 20 mm spaced away from the lens surface located in the viewing optical system and nearest to the eye point side toward the eye point side (see FIG. 12).

Being short of the lower limit of 0 to Condition (6) is not preferable because the whole length of the optical system grows long.

Exceeding the upper limit of 30 to Condition (6) is again not preferable because there is coma produced.

For the viewing optical system here, it is preferable to satisfy the following condition (7).

$$-0.68 < fasp/f < -0.15 \quad (7)$$

Here fasp is the combined focal length of the lens having said aspheric surface and the cemented lens, and f is the focal length of the whole imaging optical system.

As the lower limit of −0.68 to Condition (7) is not reached, it causes the power of the whole optical system to grow too strong. This is not preferable because the contour of the optical system grows large.

As the upper limit of −0.15 to Condition (7) is exceeded, it causes the power of the whole optical system to become too weak. This is not preferable because not only does the whole length of the optical system grow long, but also chromatic aberrations cannot well be corrected.

For the viewing optical system here, it is preferable to satisfy the following conditions (8) and (8)'.

$$1.7 < n < 2.2 \quad (8)$$

$$1.7 < n' < 2.2 \quad (8)'$$

Here n is the refractive index of the lens located in the cemented lens and nearest to the viewing plane side, and n' is the refractive index of the lens located in the cemented lens and nearest to the eye point side.

As the lower limit of 1.7 to Conditions (8) and (8)' is not reached, the radius of curvature grows tight. This is not preferable because there is coma produced.

Exceeding the upper limit of 2.2 to Conditions (8) and (8)' is not preferable because correction of field curvature, etc. is difficult.

For the viewing optical system here, it is preferable to satisfy the following condition (9).

$$|n-n'| < 0.15 \quad (9)$$

It is preferable to satisfy Condition (9) because monochromatic aberration produced at the cementing surface is reduced, and adequate correction of colors can well be done.

For the viewing optical system here, it is preferable to satisfy the following condition (10).

$$13 \text{ mm} < EP < 40 \text{ mm} \quad (10)$$

Here EP is the eye point distance that is a distance in mm from the lens surface located in the viewing optical system and nearest to the eye point side to the eye point.

As the lower limit of 13 to Condition (10) is not reached, there is no separation occurring between the center light beam and the peripheral light beam at the positive lens nearest to the eye point (for instance, the positive lens in the third lens group). This is not preferable because it is difficult to offer a sensible tradeoff between center performance and peripheral performance.

Exceeding the upper limit of 40 to Condition (10) is not preferable, partly because the positive lens nearest to the eye point grows large, and partly because the amount of aberrations produced of the peripheral light beams grows large.

For the viewing optical system here, it is preferable to satisfy the following condition (11).

$$13.5 \text{ mm} < f < 45 \text{ mm} \quad (11)$$

Here f is the focal length in mm of the whole viewing optical system.

Being short of the lower limit of 13.5 to Condition (11) is not preferable because the eye point distance becomes short.

Exceeding the upper limit of 45 to Condition (11) is not preferable because the whole optical system length grows long.

For the viewing optical system here, it is preferable to satisfy the following condition (12).

$$0.08 < \tan\theta \times EP/f < 1.6 \quad (12)$$

Here θ is the maximum angle of field,

EP is the eye point distance, and f is the focal length of the whole viewing optical system.

As the lower limit of 0.08 to Condition (12) is not reached, it causes the angle of field to become small, and the eye point distance to become short as well. This is not preferable because difficulty is encountered in separation between the light beams near the center axis and at the periphery, resulting in difficulty in offering a sensible tradeoff between center performance and peripheral performance.

As the upper limit of 1.6 to Condition (12) is exceeded, it causes the focal length of the whole viewing optical system to become short. This is not preferable because the eye point distance and the power (refracting power) of the positive lens nearest to the eye point are ill balanced with the result that peripheral performance is likely to deteriorate.

For the viewing optical system here, it is preferable to satisfy the following conditions (13) and (14).

$$0.85 < f1/f < 3 \quad (13)$$

$$0 < (r-r')/(r+r') < 30 \quad (14)$$

Here f1 is the focal length of the third lens group,
f is the focal length of the whole viewing optical system,
r is the radius of curvature of the lens surface located in the third lens group and on the viewing plane side, and
r' is the radius of curvature of the lens surface located in the third lens group and on the eye point side.

As the lower limit of 0.85 to Condition (13) is not reached, it causes the focal length of the third lens group to become short, producing large aberrations. This is not preferable because difficulty is encountered in correcting the produced aberrations.

As the upper limit of 3 to Condition (13) is exceeded, it causes the outer diameter of the viewing optical system to grow large. It also causes the amount of aberrations produced at the cemented lens to grow large. This is not preferable because difficulty is encountered in offering a sensible tradeoff between correction of chromatic aberrations and correction of monochromatic off-axis aberrations.

As the lower limit of 0 to Condition (14) is not reached, the curvature of the lens surface in the third lens group and on the viewing plane side grows tight. In this case, the principal points lie on the viewing plane side, and a principal point space with the cemented lens becomes short. This is not preferable because difficulty is encountered in the balance of astigmatism or coma in particular.

As the upper limit of 30 to Condition (14) is exceeded, the curvature of the lens surface in the third lens group and on the eye point side grows tight. This is not preferable because aberrations of peripheral light beams such as coma are more produced.

For the viewing optical system here, it is preferable to have a field stop or an image display device on a viewing plane position, and satisfy the following condition (15).

$$30 < \tan^{-1}(Y2/f) < 47 \quad (15)$$

Here Y2 is the diagonal length of the field stop or image display device, and
f is the focal length of the whole viewing optical system.

As the lower limit of 30 to Condition (15) is not reached, it causes the field of view to become narrow. This is not preferable because of the inability to increase resolution from constraints on the eye's resolving power.

As the upper limit of 47 to Condition (15) is exceeded, it causes the focal length of the whole viewing optical system to become short relative to the viewing plane. This is not preferable because there is coma produced.

With the embodiments here, it is possible to obtain a viewing optical system that is compact and adequate in terms of the eye point distance and angle of field with well corrected aberrations (such as distortion, astigmatism and chromatic aberrations), and an imaging apparatus using the same, as described above.

Some examples of the invention are now explained with reference to the drawings. Note here that each example is directed to the application of the viewing optical system to a viewfinder. In what follows, therefore, the viewing optical system will be explained with reference to the viewfinder.

Figure 1:
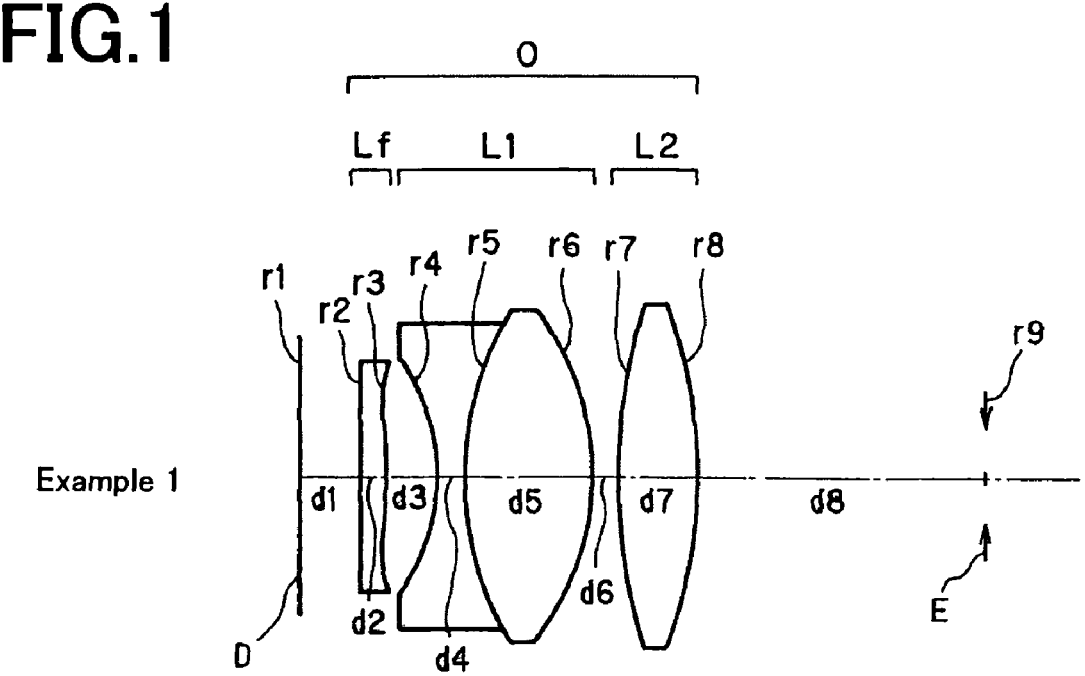
FIG. 1 is illustrative of Example 1 of the inventive viewfinder.

FIG. 1 is illustrative in section along the optical axis of the optical arrangement of the first example of the viewfinder.

The viewfinder according to the first example has a viewing optical system O located between a viewing plane D where an object image is to be formed and an eye point E.

The viewing optical system O is made up of, in order from a viewing plane D side, a first lens component L1 as the first lens group, a second lens component L2 as the second lens group, and a third lens component L3 as the third lens group. The first lens component L1 here consists of a plano-convex positive lens that is planar on the viewing plane D side. The second lens component L2 consists of a cemented lens of a double-concave negative lens and a double-convex positive lens. The third lens component L3 consists of a double-convex positive lens.

An aspheric surface is used at the lens surface of the first lens component L1 on the eye point side.

Figure 2:
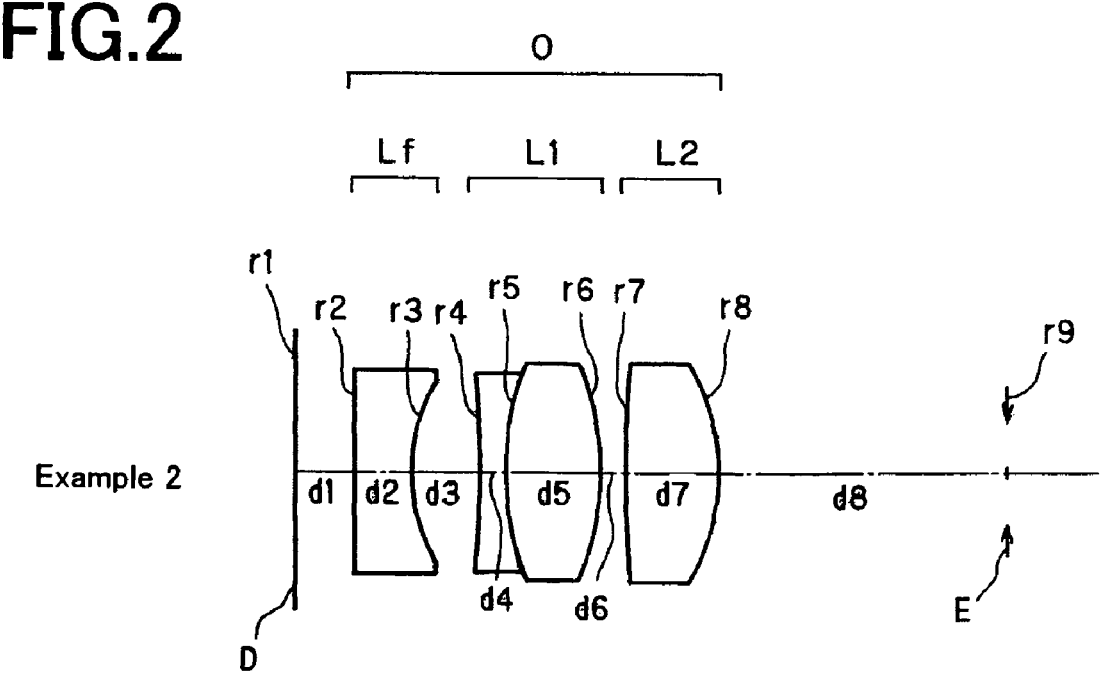
FIG. 2 is illustrative of Example 2 of the inventive viewfinder.

FIG. 2 is illustrative in section along the optical axis of the optical arrangement of the second example of the viewfinder.

The viewfinder according to the second example has a viewing optical system O located between a viewing plane D where an object image is to be formed and an eye point E.

The viewing optical system O is made up of, in order from a viewing plane D side, a first lens component L1 as the first lens group, a second lens component L2 as the second lens group, and a third lens component L3 as the third lens group. The first lens component L1 here consists of a plano-concave negative lens that is planar on the viewing plane D side. The second lens component L2 consists of a cemented lens of a double-concave negative lens and a double-convex positive lens. The third lens component L3 consists of a double-convex positive lens.

An aspheric surface is used at the surface of the first lens component L1 on the eye point side.

Figure 3:
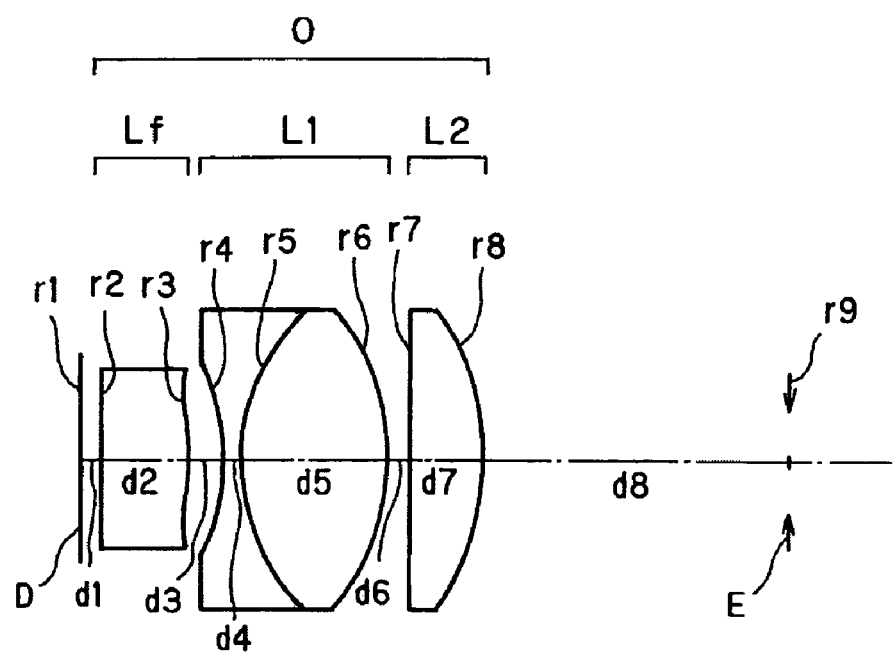
FIG. 3 is illustrative of Example 3 of the inventive viewfinder.

FIG. 3 is illustrative in section along the optical axis of the optical arrangement of the third example of the viewfinder.

The viewfinder according to the third example has a viewing optical system O located between a viewing plane D where an object image is to be formed and an eye point E.

The viewing optical system O is made up of, in order from a viewing plane D side, a first lens component L1 as the first lens group, a second lens component L2 as the second lens group, and a third lens component L3 as the third lens group. The first lens component L1 here consists of a plano-convex positive lens that is planar on the viewing plane D side. The second lens component L2 consists of a cemented lens of a double-concave negative lens and a double-convex positive lens. The third lens component L3 consists of a double-convex positive lens.

An aspheric surface is used as the surface of the first lens component L1 on the eye point side.

To enable diopter to be corrected, the viewing optical system O may be designed such that the whole or a part of it is movable. When a part of the optical system is designed to be movable, the immovable or fixed portion has a dustproof effect on the viewing plane D. There may further be a cover glass provided on the eye point side. Note here that when a display device such as a liquid crystal display device LCD or an organic EL is used with the viewing plane D, the above viewfinder may be used as an electronic viewfinder.

Numerical data on Examples 1, 2 and 3 will be set out below together with the values of all the conditions.

Referring to the numerical data on and the values of Examples 1, 2 and 3, r is the radius of curvature of each lens surface, d is the surface-to-surface space of each lens, n is the refractive index of each lens, and ν is the Abbe constant of each lens, with r for the image plane being indicative of the radius of curvature. Note here that aspheric configuration is given by the following formula where x is an optical axis provided that the direction of travel of light is positive and y is a direction orthogonal to the optical axis.

$$x = (y^2/r)/[1 + \{1-(K+1)(y/r)^2\}^{1/2}] + A2y^2 + A4y^4 + A6y^6 + A8y^8 + A10y^{10}$$

where r is a paraxial radius of curvature, K is a conic coefficient, and A2, A4, A6, A8 and A10 are the second-, fourth-, sixth-, eighth- and tenth-order aspheric coefficients, respectively.

In the numerical data, E±N (N is an integer) indicates ×10$^{\pm N}$.

Numerical Example 1 in mm

Surface Data

| Surface No. | r | d | n | vd | Effective Diameter |
|---|---|---|---|---|---|
| 1 (Viewing Plane) | ∞ | variable | | | 17.75 |
| 2 | ∞ | 2.00 | 1.52542 | 55.78 | 17.24 |
| 3 (Aspheric) | 17.872 | 4.04 | | | 17.07 |
| 4 | −17.090 | 2.14 | 1.80518 | 25.42 | 17.25 |
| 5 | 26.464 | 10.12 | 1.83481 | 42.71 | 20.94 |
| 6 | −22.094 | 2.00 | | | 23.38 |
| 7 | 46.257 | 6.24 | 1.64000 | 60.08 | 26.80 |
| 8 | −40.996 | variable | | | 22.49 |
| 9 (Virtual Stop) | ∞ | | | | |

Aspheric Coefficient
3$^{rd}$ Surface
K=0, A2=−4.26E−02, A4=1.63E−04

Amount of Change

| Diopter (m$^{-1}$) | +1 | −1 | −3 |
|---|---|---|---|
| d1 | 5.88 | 4.88 | 44.70 |
| d8 | 22.00 | 23.00 | 24.00 |

Various Data

| Diopter (m$^{-1}$) | +1 | −1 | −3 |
|---|---|---|---|
| Angle of Field | 43.55° | 44.19° | 44.70° |
| Total Length | 32.43 | 31.43 | 30.43 |
| Entrance Pupil Position | 10224.98 | −513.41 | −251.68 |

Focal Length: 22.1
Front Principal Point Position: 16.72
Front Principal Point Position: −0.39
Object Height: 8.88
Focal Length of the Lenses
First Lens Component: 65.23
Second Lens Component: 282.45
Second Lens Component Negative Lens: −12.62
Second Lens Component Positive Lens: 15.93
Third Lens Component: 34.93

Numerical Example 2 in mm

Surface Data

| Surface No. | r | d | n | vd | Effective Diameter |
|---|---|---|---|---|---|
| 1 (Viewing Plane) | ∞ | variable | | | 17.75 |
| 2 | ∞ | 4.53 | 1.52542 | 55.78 | 15.53 |
| 3 (Aspheric) | 11.316 | 5.45 | | | 13.67 |
| 4 | −58.801 | 2.00 | 1.80518 | 25.42 | 14.27 |
| 5 | 24.592 | 7.56 | 1.60311 | 60.64 | 15.03 |
| 6 | −23.063 | 2.00 | | | 16.59 |
| 7 | 148.263 | 7.29 | 1.51633 | 64.14 | 16.83 |
| 8 | −18.350 | variable | | | 16.84 |
| 9 (Virtual Stop) | ∞ | | | | |

Aspheric Coefficient
3$^{rd}$ Surface
K=0, A2=−1.69E−02, A4=7.12E−05

Amount of Change

| Diopter (m$^{-1}$) | +1 | −1 | −3 |
|---|---|---|---|
| d1 | 6.66 | 4.76 | 3.06 |
| d8 | 21.10 | 23.00 | 24.70 |

Various Data

| Diopter (m$^{-1}$) | +1 | −1 | −3 |
|---|---|---|---|
| Angle of Field | 31.67° | 33.48° | 35.02° |
| Total Length | 35.49 | 33.59 | 31.89 |
| Entrance Pupil Position | 36.20 | 36.99 | 38.07 |

Focal Length: 30.7
Front Principal Point Position: 25.01
Rear Principal Point Position: 16.82
Object Height: 8.88
Focal Length of the Lenses
Front Lens component: −34.85
First Lens Component: 138.28
First Lens Component Negative Lens: −21.31
First Lens Component Positive Lens: 20.99
Second Lens Component: 32.10

Numerical Example 3 in mm

Surface Data

| Surface No. | r | d | nd | vd | Effective Diameter |
|---|---|---|---|---|---|
| 1 (Viewing Plane) | ∞ | variable | | | 11.15 |
| 2 | ∞ | 6.50 | 1.52542 | 55.78 | 11.24 |
| 3 (Aspheric) | 8.455 | 2.68 | | | 11.49 |
| 4 | −16.092 | 1.20 | 1.80518 | 25.42 | 11.72 |
| 5 | 16.054 | 11.14 | 1.81600 | 46.62 | 22.00 |
| 6 | −17.911 | 1.53 | | | 16.31 |
| 7 | 1023.850 | 5.65 | 1.51633 | 64.14 | 15.98 |
| 8 | −20.220 | variable | | | 15.70 |
| 9 (Virtual Stop) | ∞ | | | | |

Aspheric Coefficient
3$^{rd}$ Surface
K=0, A2=−8.60E-02, A4=1.47E-04

| | Amount of Change | | |
|---|---|---|---|
| Diopter (m$^{−1}$) | +1 | −1 | −3 |
| d1 | 2.30 | 1.50 | 0.75 |
| d8 | 22.20 | 23.00 | 23.75 |

| | Various Data | | |
|---|---|---|---|
| Diopter (m$^{−1}$) | +1 | −1 | −3 |
| Angle of Field | 31.53° | 31.61° | 31.61° |
| Total Length | 30.99 | 30.19 | 29.44 |
| Entrance Pupil Position | −76.17 | −66.15 | −59.21 |

Focal Length: 19.3
Front Principal Point Position: 17.39
Rear Principal Point Position: −2.30
Object Height: 5.58
Focal Length of the Lenses
Front Lens component: 35.45
First Lens Component: 86.83
First Lens Component Negative Lens: −9.82
First Lens Component Positive Lens: 12.17
Second Lens Component: 40.75

| Condition | Ex. 1 | Ex. 2 | Ex. 3 |
|---|---|---|---|
| (1) | 0.6 | 0.8 | 1.95 |
| (2) | −0.8 | −1.9 | −0.8 |
| (3) | 0.38 | 0.98 | −0.08 |
| (3)' | 0.01 | 0.85 | −0.24 |
| (4) | −0.256~−0.260 | −0.09 | −0.235~−0.237 |
| (5) | 6.0~7.5 | 14.8~15.0 | 1.3~0.2 |
| (6) | 3.6~3.8 | 0.9~1.1 | 7.3~7.7 |
| (7) | −0.50 | −0.37 | 0.38 |
| (8) | 1.80518 | 1.80518 | 1.80518 |
| (8)' | 1.83481 | 1.60311 | 1.81600 |
| (9) | 0.03 | 0.20 | 0.01 |
| (10) | 20 | 20 | 20 |
| (11) | 22.1 | 30.7 | 19.3 |
| (12) | 0.37 | 0.20 | 0.29 |
| (13) | 1.58 | 1.05 | 2.11 |
| (14) | 16.58 | 1.28 | 1.04 |
| (15) | 44.0 | 33.0 | 31.6 |

Figure 4:
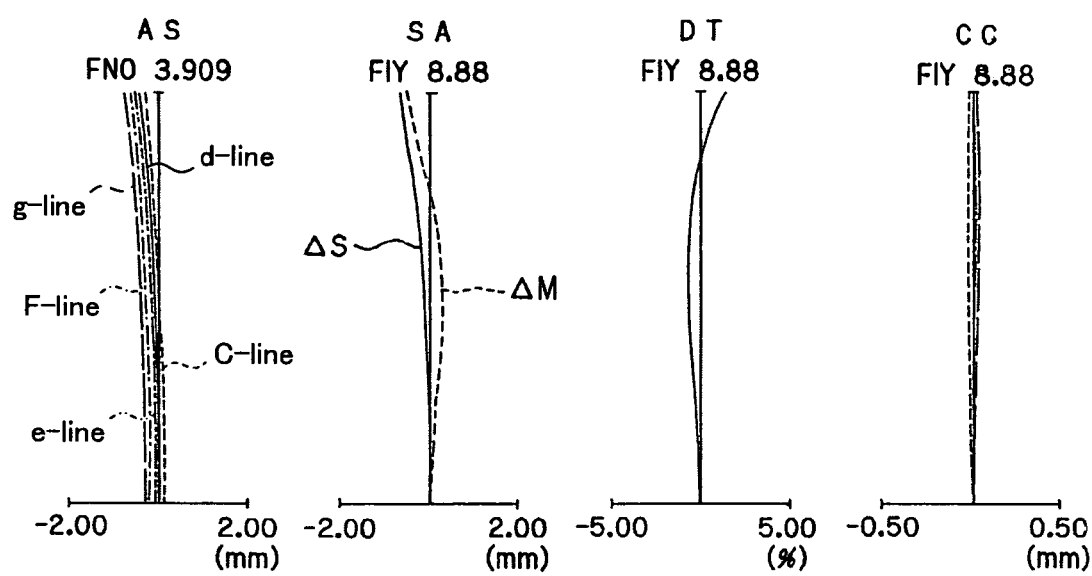
FIG. 4 is an aberration diagram for the viewfinder of Example 1.
Figure 4:
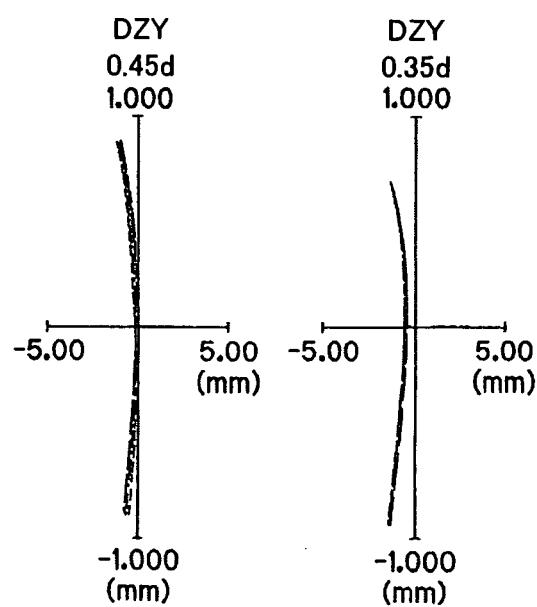
Figure 5:
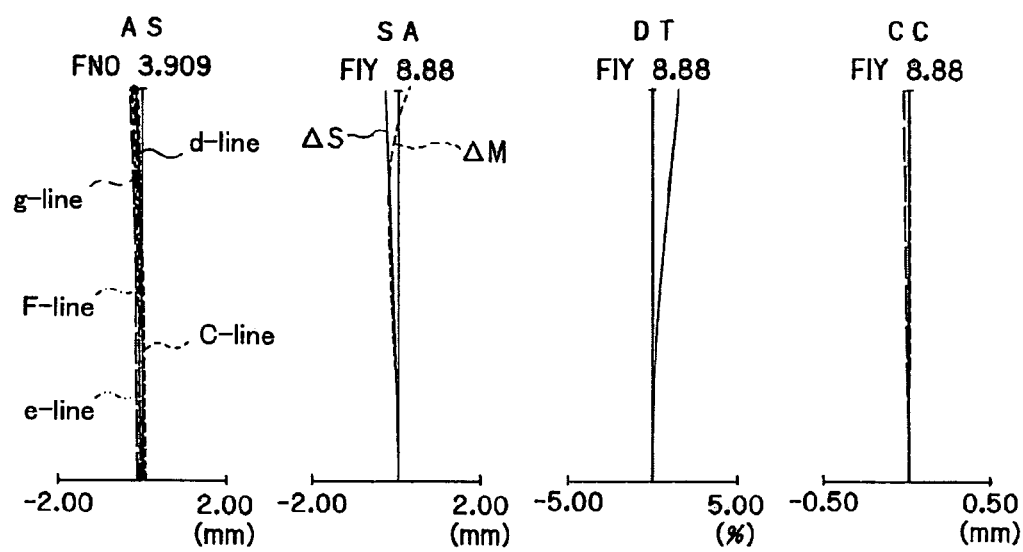
FIG. 5 is an aberration diagram for the viewfinder of Example 2.
Figure 5:
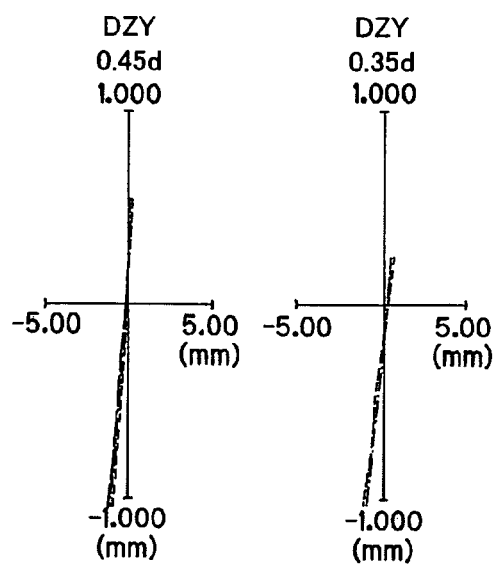
Figure 6:
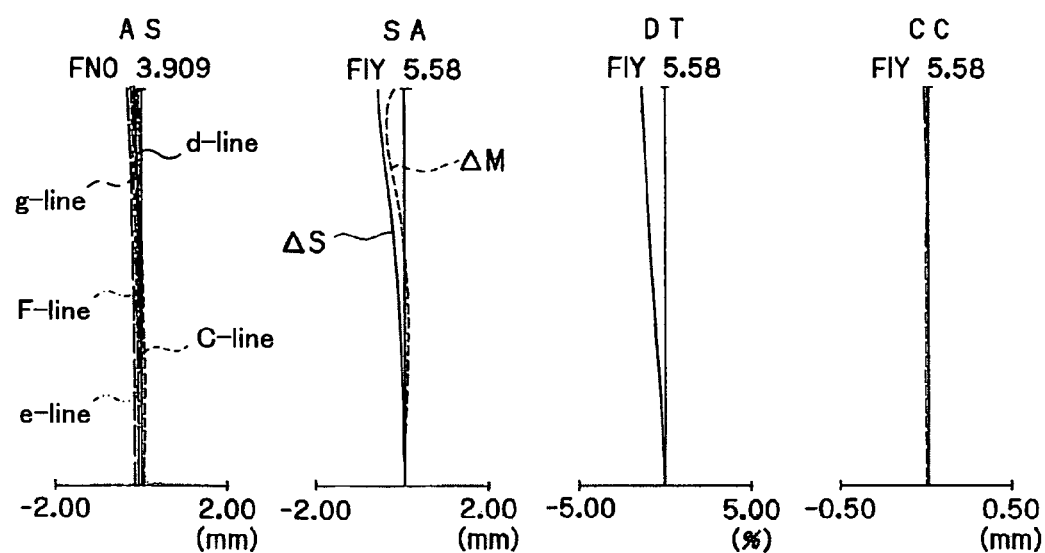
FIG. 6 is an aberration diagram for the viewfinder of Example 3.
Figure 6:
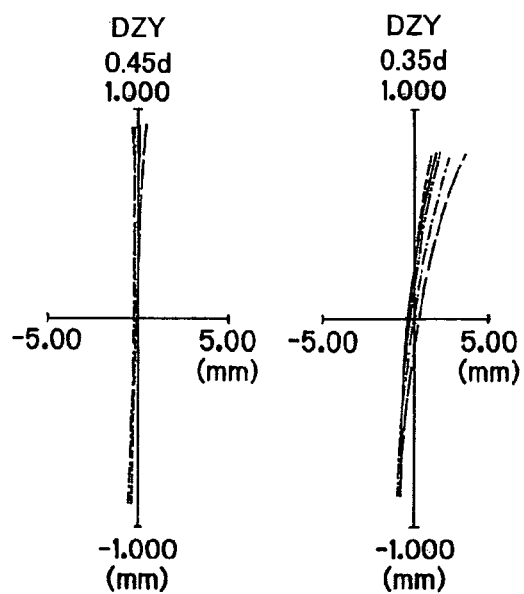

Aberration diagrams for Examples 1, 2 and 3 are presented in FIGS. 4, 5 and 6, respectively, wherein SA, AS, DT, DZY, FNO and FIY are indicative of spherical aberrations, astigmatism, distortion, coma, an F-number and an image height, respectively.

Figure 7:
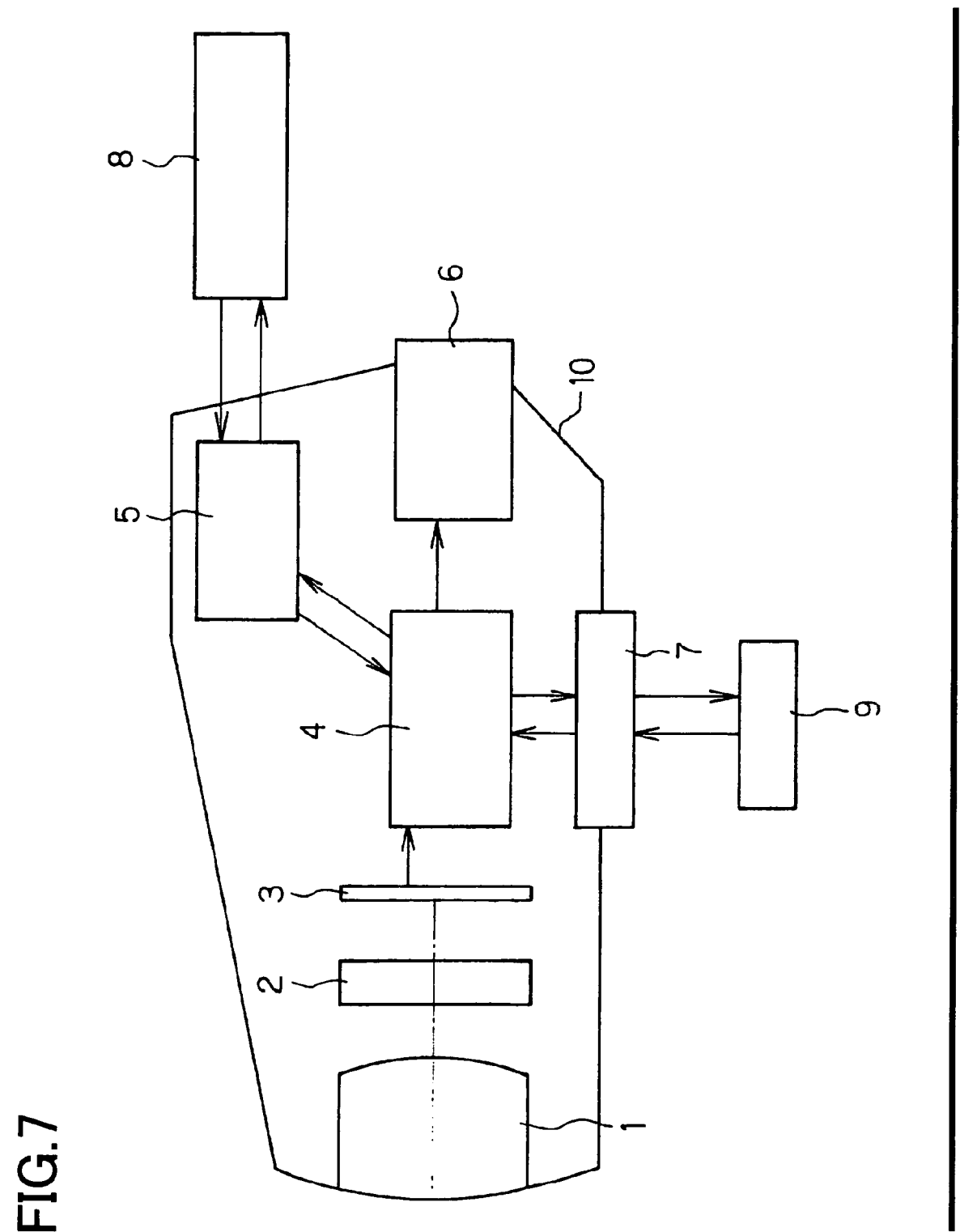
FIG. 7 is illustrative in construction of a digital camera that is one exemplar of the inventive imaging apparatus.

FIG. 7 is illustrative of the arrangement of a digital camera that is one exemplar of the inventive imaging apparatus. In FIG. 7, reference numeral 10 is a digital camera that is an imaging apparatus comprising an imaging optical system 1, a filter 2, an imaging device 3, a controller 4, a built-in memory 5, an electronic viewfinder 6 and an interface 7.

In the above imaging apparatus, the imaging optical system 1 is built up of a plurality of optical elements (such as lenses). Light coming out of an object is collected by this imaging optical system 1, and an object image is formed at this light collection position. And at this light collection position the imaging device 3 (light receiving plane) such as a CCD is located. The imaging device 3 is made up of an array of regularly arranged photoelectric elements. To prevent the moiré phenomenon, the filter 2 having a low-pass effect is located between the imaging optical system 1 and the imaging device 3. Often, there may be an infrared cut filter provided to cut off infrared light.

A light beam incident onto the imaging device 3 is converted by the photoelectric elements into electric (image) signals. The electric signals are entered in the controller 4 where signal processing such as gamma correction and image compression is applied to the electric signals. The electric signals to which signal processing has been applied are sent out to a personal computer 9 or the like via the built-in memory 5 and interface 7.

The electronic viewfinder 6 is made up of an illumination system, an image display device (not shown in FIG. 7), an eyepiece optical system (eyepiece lens), and so on. The inventive optical system O is used for the eyepiece optical system here, and an image display device is located on the viewing plane D. This image display device is controlled by the controller 4. The electronic viewfinder 6 of such arrangement enables the viewer to view an image taken, or being taken, of an object. Image data may be forwarded from the built-in memory 5 to an auxiliary memory 8. On the other hand, the same image data may be forwarded from the interface 7 to the personal computer 9.

Figure 8:
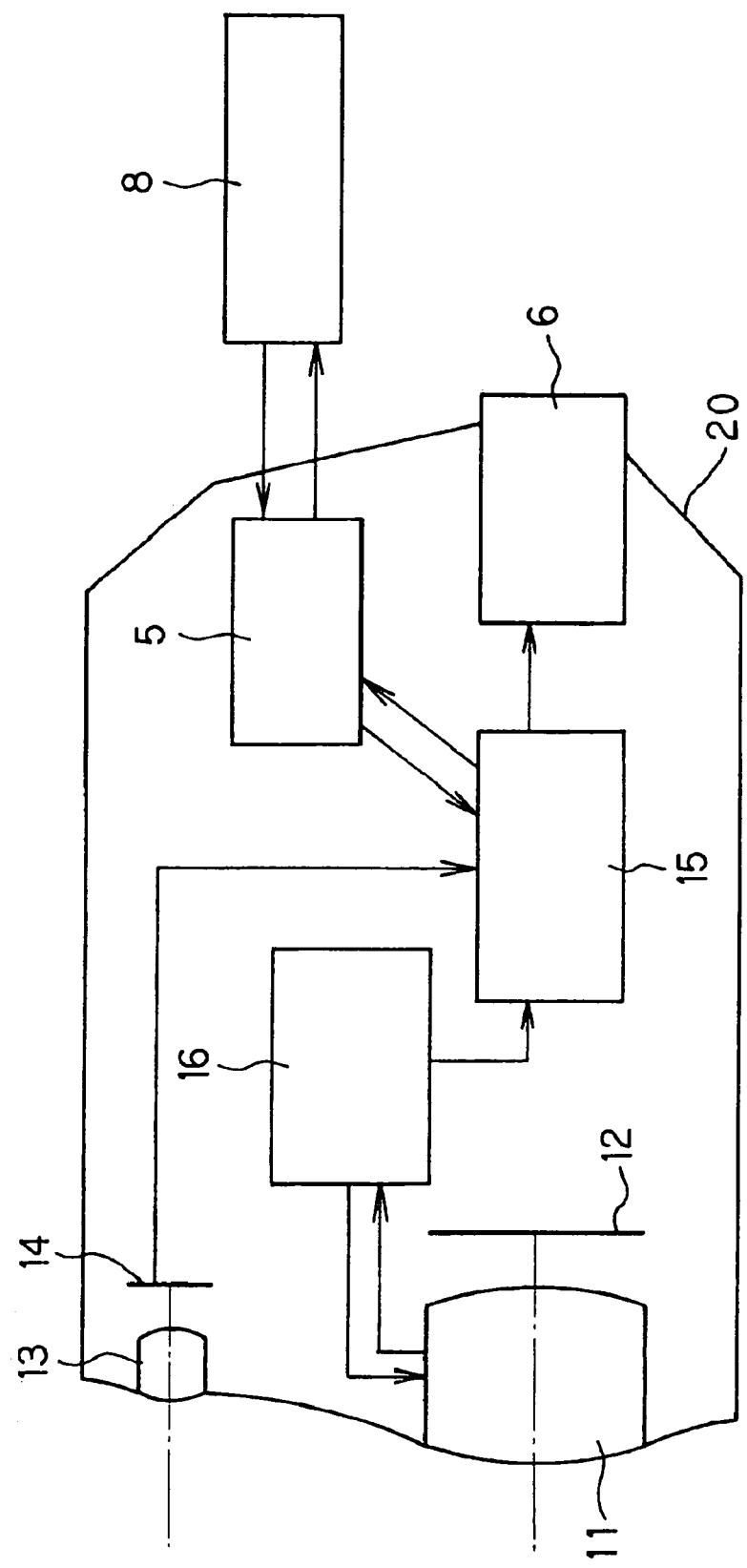
FIG. 8 is illustrative in construction of the inventive imaging apparatus applied to a silver-halide camera.

FIG. 8 is illustrative of the arrangement of a silver-halide camera to which the inventive imaging apparatus is applied. As shown in FIG. 8, a silver-halide camera 20 comprises an imaging optical system 11, a film 12, an objective lens 13, an imaging device 14 such as a CCD, a first controller 15, and a second controller 16. Further, there are a built-in memory 5 and an electronic viewfinder 6 provided as is the case with the digital camera of FIG. 7. Note here that the imaging optical system 11 and the objective lens 13 are different optical systems, as shown.

With the silver-halide camera 20 shown in FIG. 8, a light beam coming out of an object is collected by the imaging optical system 11, and an object image is formed on this light collection position (first light collection position). The film 12 is located at the first light collection position. Light beam coming out of the object is collected by the objective lens 13, and an object image is formed at this light collection position (second light collection position). The imaging device 14 such as a CCD is located at the second light collection position. The imaging device 14 is made up of an array of regularly arranged photoelectric elements.

A light beam incident onto the imaging device 14 is converted by the photoelectric elements into electric signals (image signals). The electric signals are then entered in the first controller 15 where signal processing such as gamma correction and image compression is applied to them. The electric signals to which signal processing has been applied are sent out to the image display device. As described above, the electronic viewfinder 6 is constructed of an illumination system, an image display device, an eyepiece optical system (eyepiece lens), and so on. The inventive viewing optical system O is used for the eyepiece optical system here. Via the electronic viewfinder 6, the viewer can view an object being taken of an object.

On the other hand, the user (viewer) can view the taken images, using information or the like stored in the built-in memory 5. Such control is implemented by the first controller 15.

For the purpose of controlling the imaging optical system 11, there is the second controller 16 provided. The second controller 16 lets the imaging optical system 11 implement operations such as zooming and focusing. Information for zooming, focusing or the like is recognized by the first controller 15 based on signals from the second controller 16. By virtue of this recognition, the first controller 15 can work and adjust the image to be displayed on the image display device in conformity with the taking angle of view (zooming). On the basis of information for focusing or the like, the range of the images displayed on the display device may be corrected (parallax correction). Signals from the first controller 15 may also be sent out to the built-in memory 5 or an interface (not shown). Then, these signals (information) may be produced out to a personal computer or the like via the interface.

An optical path-splitting device may be located between the imaging optical system 11 and the film 12. A light beam out of the object may be guided to the imaging device 14 via that optical path-splitting device to form an object image on the imaging device 14. And viewing may be implemented on the basis of this object image. In this case, it is not necessary to use the objective lens 13.

What we claim is:

1. A viewing optical system positioned between a viewing plane as a virtual surface and an eye point, characterized by comprising, in order from said viewing plane side,
   a first lens group including a positive lens,
   a second lens group including a cemented lens in which at least one negative lens and at least one positive lens are cemented together, and
   a third lens group including a positive lens,
   wherein:
   of lenses forming said first, second and third lens groups, at least one lens surface is composed of an aspheric surface, and
   said aspheric surface is configured such that a first normal at a first point on said surface intersects a second normal at a second point, and satisfies the following condition (1):

$$0 < ax/Ra < 1 \quad (1)$$

where ax is a distance on an optical axis from an apex of said aspheric surface to a third point, wherein, assuming that Y is a position where a farthest off-axis chief ray passes on said viewing plane, said first point is defined by a point at which an off-axis chief ray at a position 0.9 times (0.9Y) said position Y intersects said aspheric surface, said second point is defined by a point at which an off-axis chief ray at a position 0.7 times (0.7Y) said position Y intersects said aspheric surface, and N is defined by a point of intersection of said first normal and said second normal, said third point is defined by a point at which a straight line passing through said point of intersection N and vertical to said optical axis intersects said optical axis, and
   Ra is a radius of curvature of the apex of said aspheric surface.

2. The viewing optical system according to claim 1, characterized in that on said viewing plane side of said first lens group, 80% of light beams leaving a center of said viewing plane and 80% of light beams leaving a periphery of said viewing plane do not overlap.

3. The viewing optical system according to claim 1, characterized in that a lens positioned in said third lens group and nearest to said eye point side consists of one positive lens.

4. The viewing optical system according to claim 1, characterized by satisfying the following condition (2):

$$-8 < r3/f < -0.2 \quad (2)$$

where r3 is a radius of curvature of a lens surface positioned in said cemented lens and nearest to said viewing plane side, and
f is a focal length of the whole viewing optical system.

5. The viewing optical system according to claim 1, characterized in that said first lens group has said aspheric surface.

6. The viewing optical system according to claim 1, characterized in that a surface located in said first lens group and on said eye point side is said aspheric surface.

7. The viewing optical system according to claim 1, characterized in that said aspheric surface has two or more points of inflection at which curvature changes direction.

8. A viewing optical system positioned between a viewing plane as a virtual surface and an eye point, characterized by comprising, in order from said viewing plane side,
   a first lens group including a positive lens,
   a second lens group including a cemented lens in which at least one negative lens and at least one positive lens are cemented together, and
   a third lens group including a positive lens,
   wherein:
   of lenses forming said first, second and third lens groups, at least one lens surface is composed of an aspheric surface, and the following conditions (3) and (3)' are further satisfied:

$$0 < Ra/ax9 < 5 \quad (3)$$

$$0 < Ra/ax7 < 5 \quad (3)'$$

where ax9 is a distance on an optical axis from an apex of said aspheric surface to a fourth point, and ax7 is a distance on the optical axis from the apex of said aspheric surface to a fifth point, wherein:
   assuming that Y is a position where a farthest off-axis chief ray passes on said viewing plane an said first point is defined by a point at which an off-axis chief ray at a position 0.9 times (0.9Y) said position Y intersects said aspheric surface, said fourth point is defined by a position where a first normal at said first point intersects said optical axis, and assuming that a second point is defined by a point at which an off-axis chief ray at a position 0.7 times (0.7Y) said position Y intersects said aspheric surface, said fifth point is defined by a point at which a second normal at said second point intersects said optical axis, and
   Ra is a radius of curvature of the apex of said aspheric surface.

9. A viewing optical system positioned between a viewing plane as a virtual surface and an eye point, characterized by comprising, in order from said viewing plane side,
   a first lens group including a positive lens,
   a second lens group including a cemented lens in which at least one negative lens and at least one positive lens are cemented together, and
   a third lens group including a positive lens,
   wherein:
   of lenses forming said first, second and third lens groups, at least one lens surface is composed of an aspheric surface, and
   the following condition (4) is further satisfied:

$$-0.5 < \Delta x/h < -0.035 \quad (4)$$

where h is a distance of a position C where a farthest off-axis chief ray intersects said aspheric surface from an optical axis, and Δx is a distance in an optical axis direction between the aspheric surface at said point C and a generating spherical surface based on a radius of curvature of an optical axis apex of the aspheric surface.

10. A viewing optical system positioned between a viewing plane as a virtual surface and an eye point, characterized by comprising, in order from said viewing plane side,
a first lens group including a positive lens,
a second lens group including a cemented lens in which at least one negative lens and at least one positive lens are cemented together, and
a third lens group including a positive lens,
wherein:
of lenses forming said first, second and third lens groups, at least one lens surface is composed of an aspheric surface, and
the following condition (5) is further satisfied:

$$0° < \epsilon h < 20° \quad (5)$$

where εh is an angle of exit (°) of a farthest off-axis chief ray on said viewing plane, wherein said farthest off-axis chief ray is an outermost chief ray of off-axis chief rays that intersect an optical axis of said viewing optical system at a given position, wherein said given position is a position 20 mm away from a lens surface positioned in said viewing optical system and nearest to said eye point side toward said eye point side.

11. A viewing optical system positioned between a viewing plane as a virtual surface and an eye point, characterized by comprising, in order from said viewing plane side,
a first lens group including a positive lens,
a second lens group including a cemented lens in which at least one negative lens and at least one positive lens are cemented together, and
a third lens group including a positive lens,
wherein:
of lenses forming said first, second and third lens groups, at least one lens surface is composed of an aspheric surface, and
the following condition (6) is further satisfied:

$$0 < Enx/Y1 < 40 \quad (6)$$

where Enx is a distance from said viewing plane to an entrance pupil, and
Y1 is a height of a given off-axis chief ray at said viewing plane, wherein said given off-axis chief ray is a chief ray, corresponding to an angle of field of 30°, of off-axis chief rays that intersect an optical axis of said viewing optical system at a given position, wherein said given position is a position 20 mm away from a lens surface positioned in said viewing optical system and nearest to said eye point side toward said eye point side.

12. The viewing optical system according to claim 1, characterized by satisfying the following condition (8) and (8)':

$$1.7 < n < 2.2 \quad (8)$$

$$1.7 < n' < 2.2 \quad (8)'$$

where n is a refractive index of a lens located in said cemented lens and nearest to said viewing plane side, and
n' is a refractive index of a lens located in said cemented lens and nearest to said eye point side.

13. The viewing optical system according to claim 1, characterized by satisfying the following condition (9):

$$|n - n'| < 0.15 \quad (9)$$

where n is a refractive index of a lens located in said cemented lens and nearest to said viewing plane side, and
n' is a refractive index of a lens located in said cemented lens and nearest to said eye point side.

14. The viewing optical system according to claim 1, characterized by satisfying the following condition (10):

$$13 \text{ mm} < EP < 40 \text{ mm} \quad (10)$$

where EP is an eye point distance, wherein said eye point distance is a distance in mm from a lens surface positioned nearest to said eye point side of said viewing optical system to said eye point.

15. The viewing optical system according to claim 1, characterized by satisfying the following condition (11):

$$13.5 \text{ mm} < f < 45 \text{ mm} \quad (11)$$

where f is a focal length in mm of the whole viewing optical system.

16. A viewing optical system positioned between a viewing plane as a virtual surface and an eye point, characterized by comprising, in order from said viewing plane side,
a first lens group including a positive lens,
a second lens group including a cemented lens in which at least one negative lens and at least one positive lens are cemented together, and
a third lens group including a positive lens,
wherein:
of lenses forming said first, second and third lens groups, at least one lens surface is composed of an aspheric surface, and
the following condition (12) is further satisfied:

$$0.08 < \tan\theta \times EP/f < 1.6 \quad (12)$$

where θ is a maximum angle of field,
EP is said eye point distance, and
f is a focal length of the whole viewing optical system.

17. The viewing optical system according to claim 1, characterized by satisfying the following conditions (13) and (14):

$$0.85 < f1/f < 3 \quad (13)$$

$$0 < (r - r')/(r + r') < 30 \quad (14)$$

where f1 is a focal length of the third lens group,
f is a focal length of the whole viewing optical system,
r is a radius of curvature of said viewing plane side image surface in said third lens group, and
r' is a radius of curvature of said eye point side lens surface in said third lens group.

18. A viewing optical system positioned between a viewing plane as a virtual surface and an eye point, characterized by comprising, in order from said viewing plane side,
a first lens group including a positive lens,
a second lens group including a cemented lens in which at least one negative lens and at least one positive lens are cemented together, and
a third lens group including a positive lens,
wherein:
of lenses forming said first, second and third lens groups, at least one lens surface is composed of an aspheric surface, and
the viewing optical system further including a field stop or an image display device located on a position of said viewing plane, with satisfaction of the following condition (15):

$$30 < \tan^{-1}(Y2/f) < 47 \quad (15)$$

where Y2 is a diagonal length of said field stop or said image display device, and f is a focal length of the whole viewing optical system.

19. An imaging apparatus, characterized by comprising an imaging device, an image display device adapted to display an image, a controller adapted to convert image information obtained from said imaging device into signals displayable on said image display device, and a viewfinder adapted to guide an image displayed on said image display device to a viewer's eye, characterized in that the viewing optical system according to claim 1 is used for said viewfinder.

* * * * *